(12) United States Patent
Koo et al.

(10) Patent No.: US 9,349,192 B2
(45) Date of Patent: May 24, 2016

(54) METHOD AND APPARATUS FOR PROCESSING VIDEO SIGNAL

(71) Applicant: LG ELECTRONICS INC., Seoul (KR)

(72) Inventors: Moonmo Koo, Seoul (KR); Jiwook Jung, Seoul (KR); Sehoon Yea, Seoul (KR); Jin Heo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/396,686

(22) PCT Filed: Apr. 24, 2013

(86) PCT No.: PCT/KR2013/003499
§ 371 (c)(1),
(2) Date: Oct. 23, 2014

(87) PCT Pub. No.: WO2013/162273
PCT Pub. Date: Oct. 31, 2013

(65) Prior Publication Data
US 2015/0146103 A1   May 28, 2015

Related U.S. Application Data

(60) Provisional application No. 61/637,273, filed on Apr. 24, 2012, provisional application No. 61/637,803, filed on Apr. 24, 2012.

(51) Int. Cl.
*G06T 7/20* (2006.01)
*H04N 19/597* (2014.01)
(Continued)

(52) U.S. Cl.
CPC ............ *G06T 7/2033* (2013.01); *G06K 9/6201* (2013.01); *G06T 7/0071* (2013.01); *G06T 7/40* (2013.01); *H04N 5/23229* (2013.01); *H04N 19/52* (2014.11); *H04N 19/597* (2014.11)

(58) Field of Classification Search
None
See application file for complete search history.

(56) References Cited

U.S. PATENT DOCUMENTS

2002/0018063 A1* 2/2002 Donovan ................. G06T 15/50
345/426
2004/0218674 A1* 11/2004 Kondo ...................... H04N 7/50
375/240.16
2010/0008422 A1* 1/2010 Shimizu ............... H04N 19/597
375/240.16

FOREIGN PATENT DOCUMENTS

JP      2011-259230 A    12/2011
KR   10-2005-0100769 A   10/2005
KR   10-2007-0110636 A   11/2007
(Continued)

*Primary Examiner* — Michael Teitelbaum
(74) *Attorney, Agent, or Firm* — Dentons US LLP

(57) ABSTRACT

A method for processing a video signal according to the present invention comprises the steps of: determining a motion vector list comprising at least one of a spatial motion vector, a temporal motion vector, and a mutation vector as a motion vector candidate of a target block; extracting motion vector identification information for specifying the motion vector candidate to be used as a predicted motion vector of the target block; setting the motion vector candidate corresponding to the motion vector identification information as the predicted motion vector of the target block; and performing motion compensation based on the predicted motion vector. The present invention forms the motion vector candidate and derives the motion vector of the target and derives the motion vector of the target block therefrom, thus enabling a more accurate prediction of the motion vector, and thereby reduces the amount of transmitted residual data and improves coding efficiency.

6 Claims, 13 Drawing Sheets

(51) Int. Cl.
*H04N 19/52* (2014.01)
*G06K 9/62* (2006.01)
*G06T 7/00* (2006.01)
*H04N 5/232* (2006.01)
*G06T 7/40* (2006.01)

(56) References Cited

FOREIGN PATENT DOCUMENTS

KR 10-2010-0001078 A 1/2010
WO 2011-099463 A1 8/2011

* cited by examiner

FIG. 9

| (D) $d_D$ | (B) $d_B$ | (E) $d_E$ |
|---|---|---|
| (A) $d_A$ | (C) * $d_C$ | |

$d_C$ - estimate_func $(d_A, d_B, d_C, d_D)$

METHOD AND APPARATUS FOR PROCESSING VIDEO SIGNAL

This application is a National Stage Entry of International Application No. PCT/KR2013/003499 filed Apr. 24, 2013, and claims the benefit of U.S. Provisional Application Nos. 61/637,273 and 61/637,803 both filed Apr. 24, 2012, all of which are hereby incorporated by reference for all purposes as if fully set forth herein in their entireties.

TECHNICAL FIELD

The present invention relates to a method and apparatus for coding a video signal.

BACKGROUND ART

Compression refers to a signal processing technique for transmitting digital information through a communication line or storing digital information in a form suitable for a storage medium. Compression targets include audio, video, text, etc. Particularly, a technique for compressing images is referred to as video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention can perform inter-view prediction using viewpoint ID information of a reference viewpoint and a disparity vector.

The present invention can derive a current depth picture using a reference picture contained in the list of reference pictures of a current texture picture.

The present invention can detect a motion region contained in a depth picture using a motion region map, and can convert depth data of the motion region into depth data extracted from a bitstream.

The present invention can establish at least one depth picture for each viewpoint, update the depth picture, and thus derive a depth picture of other texture picture located at the same viewpoint.

The present invention can predict depth data of a current depth block using depth data of a neighbor depth block.

The present invention generates a current corrected depth picture using a global shift vector, and derives depth data of a hole region based on a global shift vector using at least one depth data located at a boundary of a current depth picture.

The present invention can correct depth data of a current depth block using a global disparity weight and a global disparity offset.

The present invention can derive a motion vector of a target block using a motion vector list including at least one of a spatial motion vector, a temporal motion vector, and a disparity vector.

The present invention uses a region-based adaptive loop filter for depth data.

Advantageous Effects

As is apparent from the above description, the embodiments of the present invention perform inter-view prediction using a disparity vector, and thus increase accuracy of video data prediction using inter-view correlation. In addition, the embodiments do not extract a disparity vector from a bitstream, and derive the disparity vector on the basis of depth data, such that the number of bits needed for coding the disparity vector can be reduced.

The embodiments of the present invention obtain a current depth picture by warping of a depth picture of a neighbor view, and obtain a current depth picture by updating depth picture located at a neighbor time zone, such that the coding efficiency of depth data of a depth picture can be improved. In addition, the current depth picture is corrected using a global shift vector, a global disparity weight, or the like, such that correct depth data is derived and accuracy of a disparity vector derived from depth data is increased, resulting in maximum efficiency of the inter-view prediction scheme.

In addition, the present invention constructs a motion vector candidate and derives a motion vector of a target block on the basis of the motion vector, such that motion vector prediction can be more accurately performed and the amount of transmitted residual data is reduced, resulting in improvement of the coding efficiency. In addition, a region-based adaptive loop filter is applied to depth data, image quality can be improved and complexity caused by filter application is reduced, such that the coding efficiency can be improved by variable filtering.

DESCRIPTION OF DRAWINGS

FIG. 9 is a conceptual diagram illustrating a neighbor depth block contiguous to a current depth block according to an embodiment of the present invention.

BEST MODE

Figure 1:
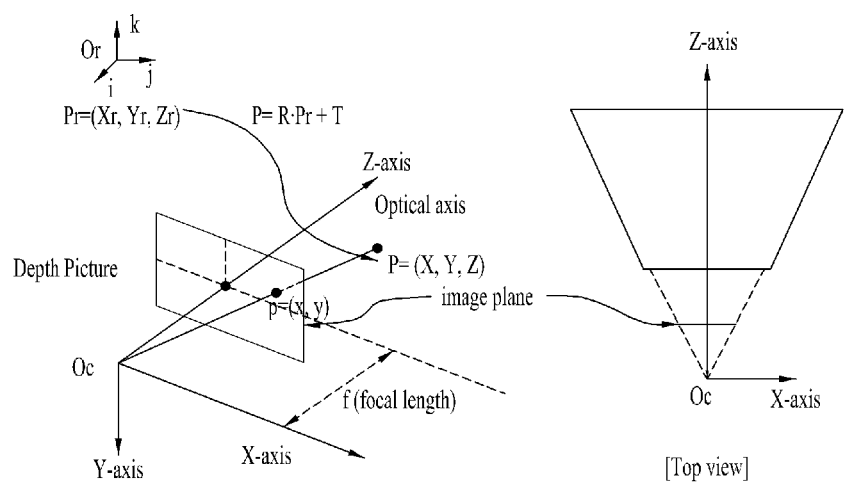
FIG. 1 is a view for explaining the concept of depth according to an embodiment to which the present invention is applied.

To accomplish the object of the present invention, a method for processing a video signal includes: acquiring a disparity vector of a target block; determining a motion vector list for the target block; determining a motion vector candidate corresponding to the motion vector ID information to be a predicted motion vector of the target block; and performing motion compensation on the basis of the predicted motion vector.

In accordance with the present invention, the disparity vector may indicate a difference between a position of the target block contained in a current viewpoint and a position of a reference block contained in a neighbor viewpoint.

In accordance with the present invention, the acquiring the disparity vector may include: acquiring a current depth picture corresponding to a current texture picture having the target block; acquiring position information of a corresponding block contained in the current depth picture from position information of the target block; acquiring depth data corresponding to position information of the corresponding block; and deriving a disparity vector of the target block using the acquired depth data and a camera parameter.

In accordance with the present invention, the acquiring the current depth picture may include: comparing viewpoint identification (ID) information of the current texture picture with viewpoint ID information of a reference picture contained in a reference picture list; if viewpoint ID information of the current texture picture is identical to that of the reference picture according to the comparison result, acquiring a difference value in output sequence information between the current texture picture and the reference picture; and selecting a reference picture having a minimum difference value as a current depth picture of the current texture picture.

In accordance with the present invention, if the number of reference pictures each having a minimum difference value is plural, a reference picture having minimum output sequence information from among the plurality of reference pictures may be selected as the current depth picture.

In accordance with the present invention, the method may further include: determining whether to apply a region-based adaptive loop filter to a current pixel value on the basis of a variance of a depth block contained in the current depth picture; and if the region-based adaptive loop filter is applied, acquiring a filtered current pixel value by applying a weight to a neighbor pixel value.

In accordance with the present invention, the determining the motion vector list of the target block may include: determining the presence or absence of reference picture identity between the target block and a neighbor block; if the presence of reference picture identity between the target block and the neighbor block is determined, adding a motion vector of a neighbor block having the same reference picture to the motion vector list; if the absence of reference picture identity between the target block and the neighbor block is determined, applying a scaling factor to a motion vector of the neighbor block; and adding a motion vector of the scaled neighbor block to the motion vector list.

In accordance with the present invention, the temporal motion vector may be a motion vector contained in a collocated block of the target block within a reference picture contained in the same viewpoint as that of the target block, and the reference picture contained in the same viewpoint may be specified by reference index information of a picture having the collocated block.

[Mode for Invention]

A technique for encoding or decoding multiview video signal data considers spatial redundancy, temporal redundancy and inter-view redundancy. In the case of multiview video, it is necessary to code a multiview texture image captured at two or more viewpoints and a multiview depth image corresponding to the multiview texture image in order to generate a 3D image. A depth image can be coded in consideration of spatial redundancy, temporal redundancy or inter-view redundancy. Each sample value of the depth image represents information on a distance between a camera and a corresponding pixel, which will be described in detail below with reference to FIG. 1. In the specification, depth information, depth data, a depth picture, a depth sequence, depth coding, and a depth bitstream may be flexibly interpreted as depth related information. In addition, coding may include both encoding and decoding and may be flexibly interpreted in the technical spirit and technical scope of the present invention.

FIG. 1 is a view for explaining the concept of depth according to an embodiment to which the present invention is applied.

Referring to FIG. 1, a camera position Oc indicates the origin of a three-dimensional (3D) camera coordinate system and the Z axis (optical axis) of the camera coordinate system is aligned with a gaze direction of a user. An arbitrary point $P=(X, Y, Z)$ in the camera coordinate system can be projected to a point $p=(x, y)$ on a two-dimensional image plane perpendicular to the X axis. Here, the point $p=(x, y)$ on the two-dimensional image plane can be represented as a texture value or a color value of the point $P=(X, Y, Z)$ of the three-dimensional coordinate system. In this case, the two-dimensional image plane may mean a texture picture. The point $p=(x, y)$ on the two-dimensional image plane can be represented as a Z value of the point $P=(X, Y, Z)$ of the three-dimensional coordinate system. In this case, the two-dimensional image plane may mean a depth picture or a depth map.

While $P=(X, Y, Z)$ of the three-dimensional coordinate system indicates an arbitrary point of the camera coordinate system, a common reference coordinate system for a plurality of cameras may be necessary when the cameras are used. In FIG. 1, an arbitrary point $Pw=(Xw, Yw, Zw)$ of a reference coordinate system having a point Ow as the origin can be converted into a point $P=(X, Y, Z)$ of the camera coordinate system using a 3×3 rotation matrix R and a 3×1 translation vector T. For example, P can be obtained by Equation 1.

$$P = R \times P_W + T \qquad \text{[Equation 1]}$$

Based on the above description, a depth picture can be defined as a set of information corresponding to relative numerical values of distances between the camera position and an object on the basis of the camera position. Depth information in the depth picture can be obtained from the Z value of three-dimensional coordinates $P=(X, Y, Z)$ on the camera coordinate system, which corresponds to an arbitrary pixel of a texture picture. Here, the Z value belongs to the real number range and may be quantized into a value belonging to the integer range and used as depth information. For example, the depth information can be quantized as represented by Equation 2 or 3.

$$Z_q = \text{round}\left(255 \times \frac{Z - Z_{near}}{Z_{far} - Z_{near}}\right) \quad \text{[Equation 2]}$$

$$Z_q = \text{round}\left(255 \times \frac{\frac{1}{Z} - \frac{1}{Z_{far}}}{\frac{1}{Z_{near}} - \frac{1}{Z_{far}}}\right) \quad \text{[Equation 3]}$$

Here, Zq denotes quantized depth information. Referring to the top view of FIG. 1, Znear may represent the lower limit of the Z coordinate value and Zfar may represent the upper limit of the Z coordinate value. The depth information quantized according to Equation 2 or 3 can have an integer value in the range of 0 to 255.

The depth picture may be coded into a sequence along with or separately from a texture image sequence. In this case, various embodiments for compatibility with conventional codecs may be applied. For example, a depth coding technique can be applied as an additional technique for compatibility with the HEVC codec or applied as an extended technique in H.264/AVC multiview video coding. A method and apparatus for predicting texture data using depth data will be given below.

$$E = \frac{1}{N} \sum_{(x,y)} [|C_{(x,y)} - C_{(x-1,y)}| + |C_{(x,y)} - C_{(x+1,y)}|]^2 \quad \text{[Equation 4]}$$

In Equation 4, E denotes complexity of texture data, C represents reconstituted texture data and N represents the number of pixels in a texture data region for which complexity is to be calculated. Referring to Equation 4, the complexity can be calculated using a difference value between texture data corresponding to a point (x, y) and texture data corresponding to a point (x−1, y) and a difference value between the texture data corresponding to the point (x, y) and texture data corresponding to a point (x+1, y). In addition, the complexity can be calculated for the texture picture and texture block, respectively, and a quantization parameter can be derived using the complexity, as represented by Equation 5.

$$QP = \min\left(\max\left(\alpha \log_2 \frac{E_f}{E_b}, -\beta\right), \beta\right). \quad \text{[Equation 5]}$$

Referring to Equation 5, the quantization parameter can be determined on the basis of the ratio of the complexity of the texture picture to the complexity of the texture block. α and β may be variable integers derived in the decoder or predetermined integers in the decoder.

The intra prediction unit 400 may perform inter prediction using the reconstituted depth data of the current depth picture. The intra prediction unit 400 may perform inter prediction in the same manner as in a texture picture. For example, the coding information used for inter prediction of the texture picture may also be used in the depth picture. In this case, the coding information used for inter prediction may include an intra prediction mode and partition information of intra prediction. The in-loop filtering unit 500 may apply an in-loop filter to each coded block in order to reduce block distortion.

The in-loop filter improves quality of a decoded image by smoothing the edge of a block. A filtered texture picture or depth picture may be output or stored in the decoded picture buffer unit 600 to be used as a reference picture. Since texture data and depth data have different characteristics, coding efficiency may be deteriorated when the texture data and the depth data are coded using the same in-loop filter. Accordingly, a separate in-loop filter for the depth data needs to be defined. As an in-loop filtering method for efficiently coding depth data, a region-based adaptive loop filter and a trilateral loop filter will hereinafter be described in detail.

The in-loop filtering unit 500 may determine whether to apply the region-based adaptive loop filter on the basis of a variance of a depth block. The depth block variance may be defined as a difference between a maximum pixel value and a minimum pixel value in the depth block. By comparing variance of the depth block with a predetermined threshold value, it can be determined whether to perform filter application. For example, if the depth block variance is equal to or higher than a predetermined threshold value, this means a large difference between a maximum pixel value and a minimum pixel value of the depth block, such that the region-based adaptive loop filter must be applied. On the contrary, when the depth block variance is less than the predetermined threshold value, the filer may not be applied. When the filter is applied according to the comparison result, pixel values of the filtered depth block can be derived by applying a predetermined weight to neighboring pixel values. The predetermined weight may be determined on the basis of a position difference between a currently filtered pixel and a neighbor pixel and/or a difference value between the currently filtered pixel value and the neighbor pixel value. The neighbor pixel value is not the currently filtered pixel value and may be one of pixel values included in the depth block.

While the trilateral loop filter according to the present invention is similar to the region-based adaptive loop filter, the trilateral loop filter is distinguished from the region-based adaptive loop filter in that the former additionally considers texture data. Specifically, the trilateral loop filter can extract depth data of a neighbor pixel which satisfies the following three conditions.

$|p-q| \leq \sigma 1$            Condition 1.

$|D(p)-D(q)| \leq \sigma 2$            Condition 2.

$|V(p)-V(q)| \leq \sigma 3$            Condition 3.

Condition 1 compares a position difference between the current pixel (p) and a neighbor pixel (q) in the depth block with a predetermined parameter, Condition 2 compares a difference between depth data of the current pixel (p) and depth data of the neighbor pixel (q) with a predetermined parameter, and Condition 3 compares a difference between texture data of the current pixel (p) and texture data of the neighbor pixel (q) with a predetermined parameter.

Neighbor pixels that satisfy the three conditions may be extracted and the current pixel (p) may be filtered using a median or average of depth data of the extracted neighboring pixels.

The decoded picture buffer unit 600 stores or opens previous coded texture pictures or depth pictures for intra prediction. To store or open the previous coded texture pictures or depth pictures, a frame number frame_num and POC (Picture Order Count) of each picture are used. Furthermore, the previous coded pictures include depth pictures at viewpoints different from the viewpoint of the current depth picture in depth coding. To use the depth pictures as reference pictures, viewpoint identification information for identifying a viewpoint of a depth picture may be used. The decoded picture buffer unit 600 may manage reference pictures using an adaptive memory management control operation method, a sliding window method and the like in order to implement intra prediction more flexibly. This is for the purpose of integrating a reference picture memory and a non-reference picture memory into one memory and efficiently managing the memory with small capacity. In depth coding, depth pictures may be marked by a separate indication, to be discriminated from texture pictures in the decoded picture buffer unit 600 and information for identifying each depth picture may be used in the marking process. The reference picture managed through this process may be used for depth coding in the inter prediction unit 700.

The inter prediction unit 700 may perform motion compensation of a current block using the reference pictures and motion information stored in the decoded picture buffer unit 600. In the specification, motion information may be understood as information including a motion vector and reference index information in a broad sense. Motion compensation may be performed using one reference picture in an L0 reference picture list. In addition, motion compensation may be performed using a plurality of reference pictures from an L1 reference picture list as well as the L0 reference picture list. In the case of a multiview image captured through a plurality of cameras, inter-view disparity caused by a camera position difference may be generated. To compensate for this inter-view disparity, a disparity vector may be used. The disparity vector can be defined as a difference between a position of a target block corresponding to the current viewpoint and a position of a reference block corresponding to a neighboring viewpoint. A method for acquiring a disparity vector will hereinafter be described with reference to FIG. 3.

Figure 3:
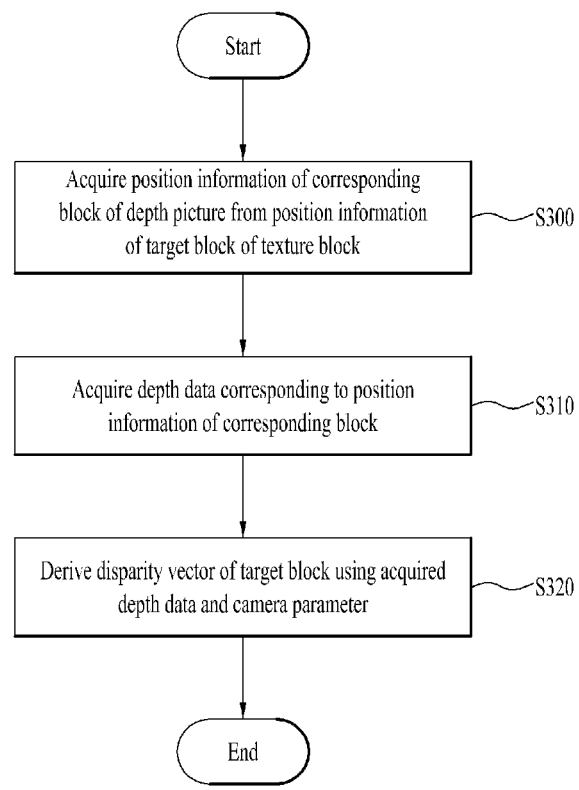
FIG. 3 is a flowchart illustrating a method for deriving a disparity vector of a target block contained in a texture picture using depth data according to an embodiment of the present invention.

FIG. 3 is a flowchart illustrating a method for deriving a disparity vector of a target block contained in a texture picture using depth data according to an embodiment of the present invention.

Specifically, position information of a corresponding block of a depth picture can be obtained from position information of a target block of a text picture in step S300. As the depth picture of the present invention, any one of a) a predicted depth picture, b) a reconstructed depth picture, and c) a reconstructed and filtered depth picture may be selectively used. A method for acquiring the predicted depth picture according to the present invention will hereinafter be described with reference to FIGS. 4 to 6. Here, the position of the corresponding block of the depth picture can be determined in consideration of spatial resolution. If the depth picture and the texture picture are coded at the same spatial resolution, the position of the corresponding block of the depth picture can be determined as a block at the same position as the target block of the texture picture. However, spatial resolutions of the texture picture and the depth picture may be coded differently because coding efficiency may not be remarkably decreased even when depth information is coded in reduced spatial resolution owing to characteristics of the depth information that represents a distance between a camera and an object. Accordingly, when spatial resolution of the depth picture is coded lower than the texture picture, a decoder can upsample the depth picture prior to acquisition of the position information of the corresponding block of the depth picture. In addition, when aspect ratios of the upsampled depth picture and the texture picture do not correctly correspond to each other, offset information may be additionally considered in acquisition of the position information of the corresponding block in the upsampled depth picture. For example, the offset information can include top offset information, left offset information, right offset information and bottom offset information. The top offset information may represent a position difference between at least one pixel located at the top of the upsampled depth picture and at least one pixel located at the top of the texture picture. The left offset information, right offset information and bottom offset information can be defined in the same manner.

Depth data corresponding to position information of the corresponding block contained in the depth picture can be obtained in step S310. When a plurality of pixels is present in the corresponding block, depth data corresponding to a corner pixel of the corresponding block or depth data corresponding to a center pixel of the corresponding block may be used. Otherwise, a maximum value, a minimum value and a most frequent value from among depth data corresponding to a plurality of pixels may be selectively used or the average value of the depth data may be used.

A disparity vector of the target block may be derived using the obtained depth data and camera parameters in step S320. A detailed method for deriving the disparity vector will now be described based on Equations 6 and 7.

$$Z = \frac{1}{\frac{D}{255}S\left(\frac{1}{Z_{near}} - \frac{1}{Z_{far}}\right) + \frac{1}{Z_{far}}} \quad \text{[Equation 6]}$$

In Equation 6, Z denotes a distance between a corresponding pixel and a camera and D denotes the quantized value of Z and corresponds to depth data according to the present invention. In addition, $Z_{near}$ and $Z_{far}$ respectively represent a minimum value and a maximum value of Z, defined for a viewpoint corresponding to the depth picture. $Z_{near}$ and $Z_{far}$ may be extracted from a bitstream through a sequence parameter set, a slice header or the like and may be information predetermined in the decoder. Accordingly, when the distance Z between the corresponding pixel and the camera is quantized into 256 levels, Z can be reconstituted using depth data, $Z_{near}$ and $Z_{far}$ as represented by Equation 3. Then, the disparity vector for the target block can be derived using the reconstituted Z, as represented by Equation 7.

$$d = \frac{f \times B}{Z} \quad \text{[Equation 7]}$$

In Equation 7, f denotes a focal length of a camera and B denotes a distance between cameras. It can be assumed that all cameras have the same f and B, and thus f and B may be information predefined in the decoder.

Depth data of the depth picture may be derived using an arbitrary value selected from among the range of available values capable of being used as depth data. The available values capable of being used as depth data may have the range of 0~N (where N is a natural number), and may be predetermined by the decoder. Alternatively, depth data of the present invention may be derived as a median or average of the minimum value and the maximum value within the range of values capable of being used as depth data. For example, if the values capable of being used as depth data have the range of 0~N (where N is a natural number), depth data of the depth picture may be derived as N/2. Alternatively, depth data of the present invention may be depth data having been transmitted from the encoder. In this case, depth data transmitted from the encoder may be transmitted on the basis of a depth picture, and may also be transmitted on a partition basis. Here, the term "partition" may denote a region obtained when the depth picture is divided into predetermined-sized depth pictures, and may include a depth slide, a depth block, etc.

In case of a current texture picture, a depth picture (hereinafter referred to as a reference depth picture) of a reference texture picture may be used as a depth picture (hereinafter referred to as a current depth picture) of the current texture picture. For example, any one reference texture picture may be selected from among a plurality of reference texture pictures contained in the reference picture list of the current texture picture. A method for selecting a reference texture picture from among the reference picture list will hereinafter be described with reference to FIG. 4. Depth data of the selected reference texture picture may be established as depth data of the current texture picture.

Figure 4:
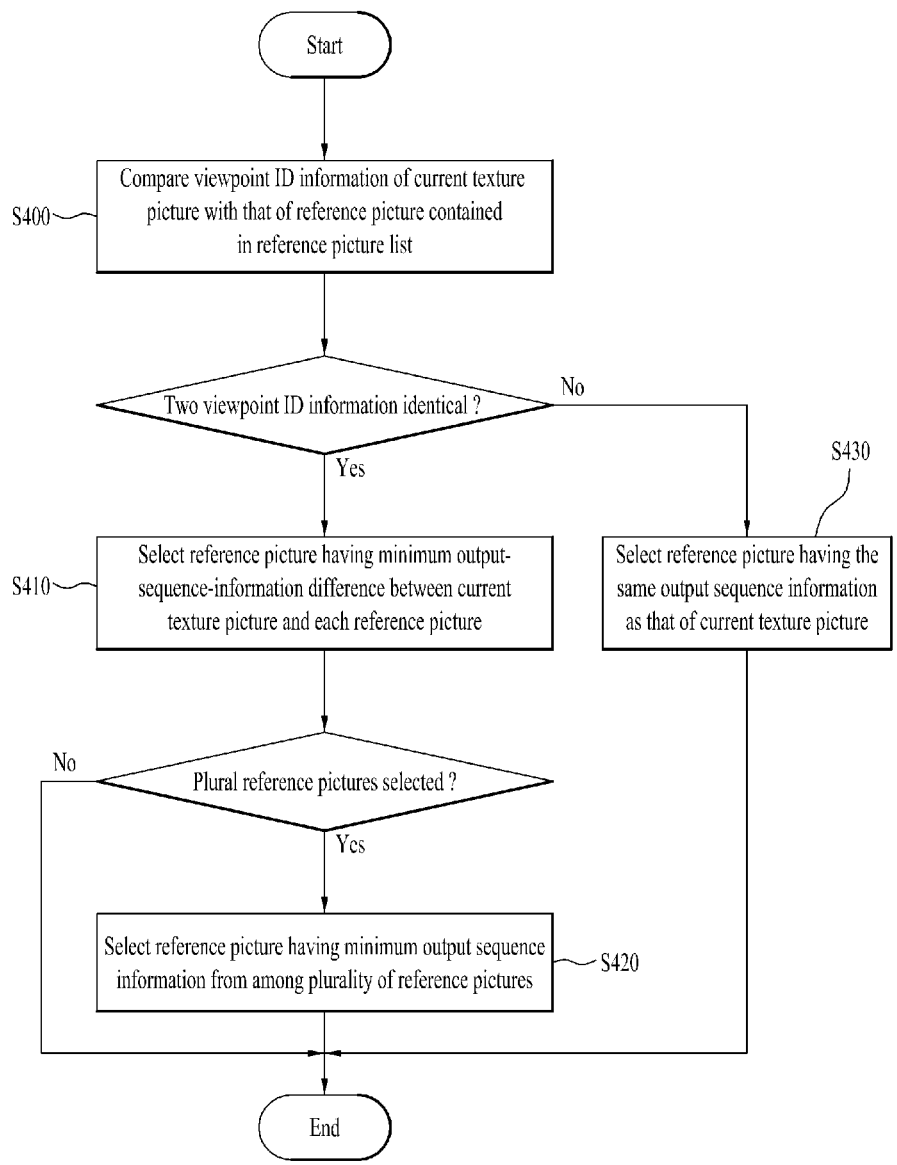
FIG. 4 is a flowchart illustrating a method for selecting a reference texture picture for depth data of a current texture picture from a reference picture list on the basis of viewpoint ID information and output sequence information according to an embodiment of the present invention.

FIG. 4 is a flowchart illustrating a method for selecting a reference texture picture for depth data of a current texture picture from a reference picture list on the basis of viewpoint ID information and output sequence information according to an embodiment of the present invention.

Referring to FIG. 4, viewpoint ID information of a current texture picture is compared with that of a reference texture picture contained in a reference picture list in step S400. The viewpoint ID information may indicate specific information specifying a viewpoint to which the picture pertains. If the viewpoint ID information of the current texture picture is identical to that of the reference texture picture, this means that the current texture picture and the reference texture picture are located at the same viewpoint. In this case, the current texture picture may be the temporally nearest reference texture picture because there is a high probability that depth data of the temporally nearest reference texture picture is similar to depth data of the current texture picture. In order to select the temporally nearest reference texture picture, output sequence information may be used. The output sequence information may be an index for indicating a temporal sequence or output sequence of the reconstructed picture. For example, a reference texture picture having a minimum difference in output sequence information between the current texture picture and the reference texture picture may be selected in step S410. If there is a plurality of reference texture pictures each having a minimum difference in output sequence information between the current texture picture and the reference texture picture, a reference texture picture having minimum output sequence information may be selected from among a plurality of reference texture pictures in step S420. However, the scope or spirit of the present invention is not limited thereto, and the reference texture picture may be selected in consideration of the decoding sequence of the plurality of reference texture pictures. Here, a frame number indicating the decoding sequence of pictures may be used. For example, a reference texture picture having a maximum frame number may be selected according to the comparison result of frame numbers of the reference texture pictures.

If viewpoint ID information of two texture pictures are compared with each other in step S400, a reference texture picture having the same viewpoint ID information as that of the current texture picture may not be present in the reference picture list. For example, in the case of an anchor picture of the multiview image, only inter-view prediction is performed, and intra prediction in a time direction is not performed. If the current texture picture is an anchor picture, the reference texture picture having the same viewpoint ID information may not be present in the reference picture list. In this case, a reference texture picture having the same output sequence information as that of the current texture picture may be selected in step S430.

If the reference texture picture located at a viewpoint different from that of the current texture picture is selected, the reference depth picture is warped to derive the current depth picture. The term "warping" may indicate a method for deriving depth data of the current depth picture from depth data of the reference depth picture using a disparity vector. For example, an exemplary case in which the N-th line of the reference depth picture is warped by the N-th line of the current depth picture. First of all, an initial value of depth data located at the N-th line may be configured. "Value indicating an invalid state" (hereinafter referred to as an invalid value) (for example, 0) may be used as the initial value of the present invention. Thereafter, after calculation of depth data (D) located at the N-th line of the reference depth picture, a disparity vector (d) corresponding to each depth data can be derived using camera parameters (f, B). The method for deriving the disparity has already been disclosed with reference to Equations 6 and 7, and as such a detailed description thereof will herein be omitted for convenience of description. A position (x+d, y) of depth data of the current depth picture corresponding to the position (x, y) of depth data of the reference depth picture can be derived using the disparity vector (d). Depth data corresponding to the position (x, y) of the reference depth picture may be allocated to the position (x+d, y) of the current depth picture. If the operation for performing warping from the N-th line of the reference depth picture to the N-th line of the current depth picture is completed, a specific region to which no depth data is allocated (i.e., a region to which "value indicating an invalid state" is allocated) can be searched for in the current depth picture. If the specific region to which depth data is not allocated is present in the N-th line of the current depth picture, depth data of the corresponding region can be derived using depth data contiguous to the corresponding region. For example, if the invalid value is allocated to successive pixels from the P-th pixel to the Q-th pixel of the N-th line, depth data of the corresponding region can be derived using any one of depth data of the left pixel (i.e., (P−1)-th pixel) contiguous to the corresponding region and depth data of the right pixel (i.e., (Q+1)-th pixel). In this case, depth data of the corresponding region may be configured as a smaller one from among the left-pixel depth data and the right-pixel depth data. However, if the corresponding region contacts a boundary of the current depth picture, any one of the left pixel and the right pixel may not be present. For example, if the corresponding region contacts a right boundary of the current depth picture, the right pixel contiguous to the corresponding region is not present, so that it can be determined that depth data of the right pixel contiguous to the corresponding region is used. On the contrary, if the corresponding region contacts a right boundary of the current depth picture, depth data of the right pixel contiguous to the corresponding region can be used.

Figure 5:
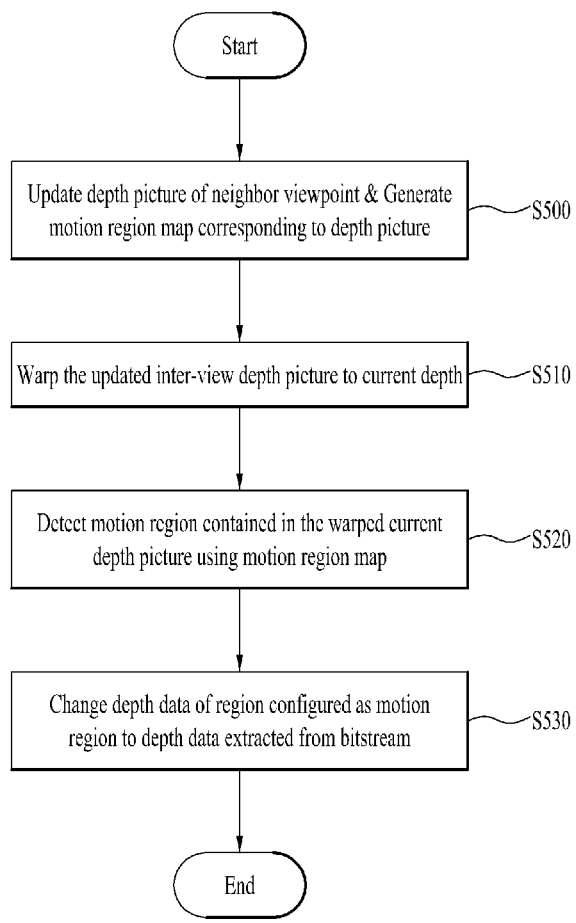
FIG. 5 is a flowchart illustrating a method for acquiring a depth picture of a current viewpoint from a depth picture of a neighbor viewpoint using a motion region map according to an embodiment of the present invention.

FIG. 5 is a flowchart illustrating a method for acquiring a depth picture of a current viewpoint from a depth picture of a neighbor viewpoint using a motion region map according to an embodiment of the present invention.

Referring to FIG. 5, a depth picture of the neighbor viewpoint may be updated, and a motion region map corresponding to the depth picture may be generated in step S500. Here, the term "neighbor viewpoint" indicates a specific viewpoint at which decoding has been completed prior to a current viewpoint. For example, a non-base view of the current viewpoint may be any one of a base view of the neighbor viewpoint and a non-base view at which decoding has been completed prior to the current viewpoint. The base view may indicate a specific viewpoint at which other viewpoint is independently decoded without referring to another viewpoint, and the non-base view may indicate a specific viewpoint but not the base view. Meanwhile, the depth picture of the neighbor viewpoint (hereinafter referred to as an inter-view depth picture) may be a picture located at the same time zone as that of the current depth picture (hereinafter referred to as a depth picture). The update method according to the present invention will hereinafter be described with reference to FIG. 7. The motion region map may be a picture indicating a specific block in which motion estimation is performed in the texture picture corresponding to the depth picture. That is, if the texture block of the texture picture corresponding to the depth block of the depth picture is a block coded by the inter mode, '1' may be allocated to the corresponding region of the motion region map corresponding to the depth block of the depth picture, and '0' may be allocated to the corresponding region of the motion region map when the corresponding texture block is coded by the intra mode. In this way, the motion region map corresponding to the depth picture of the neighbor viewpoint can be generated.

The updated inter-view depth picture may be warped to the current depth picture in step S510. A method for performing warping from the inter-view depth picture to the current depth picture is identical to the above-mentioned method. That is, a disparity vector is derived from depth data of the inter-view depth picture, the position of depth data of the current depth picture corresponding to the position of depth data of the inter-view depth picture can be derived using the derived disparity vector, and depth data of the inter-view depth picture may be allocated to the position of depth data of the current depth picture.

A motion region contained in the current depth picture warped can be detected using the motion region map in step S520. If the position of depth data of the inter-view depth picture corresponding to the position of each depth data of the warped current depth picture is acquired, and if the corresponding region of the motion region map corresponding to the position of depth data of the acquired inter-view depth picture is set to 1, the corresponding depth data of the warped current depth picture may be configured as the motion region. In this way, the motion region contained in the warped current depth picture can be detected.

Depth data of the region configured as the motion region may be changed to depth data extracted from the bitstream in step S530. If the inter-view depth picture is warped to the current depth picture using the disparity vector, it may be difficult to correctly predict depth data of the current depth picture. Accordingly, in order to reflect motion compensation to the motion region of the current depth picture, the encoder may directly code depth data to which the motion compensation result has been reflected to the decoder. In the meantime, the motion region map is not used, and a specific value indicating that depth data is invalid (for example, invalid depth value) may be used, and a detailed description thereof will hereinafter be described with reference to FIG. 6.

Figure 6:
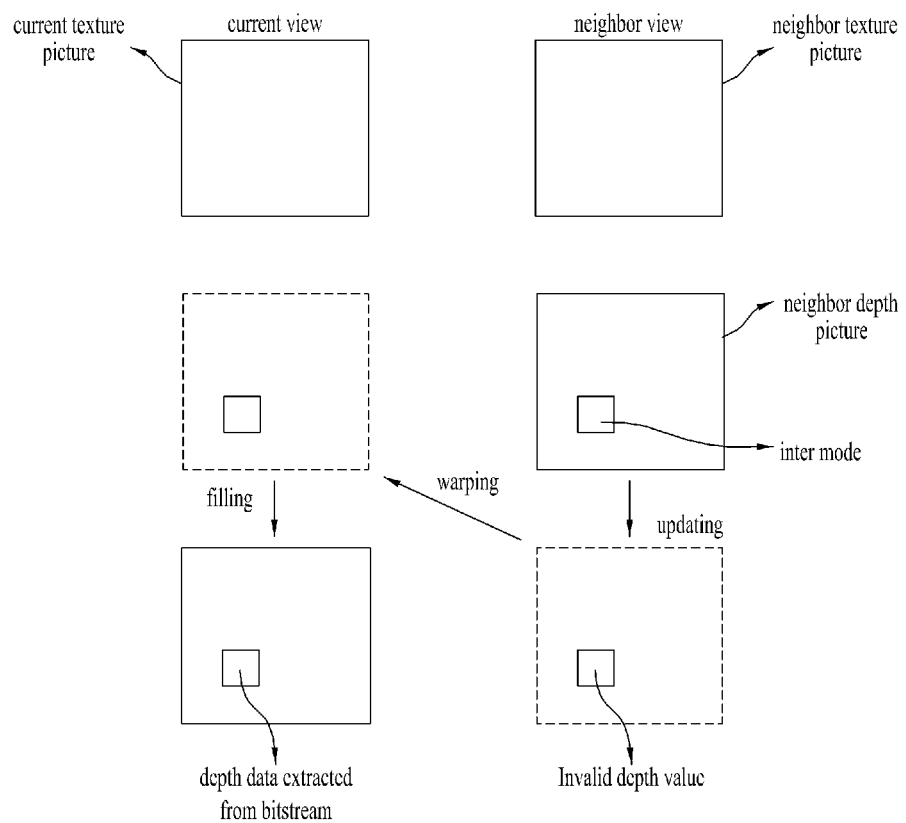
FIG. 6 is a flowchart illustrating a method for acquiring a depth picture of a current viewpoint from a depth picture of a neighbor viewpoint using a specific value indicating that depth data is invalid according to an embodiment of the present invention.

FIG. 6 is a flowchart illustrating a method for acquiring a depth picture of a current viewpoint from a depth picture of a neighbor viewpoint using a specific value indicating that depth data is invalid according to an embodiment of the present invention.

Referring to FIG. 6, during the update process of the inter-view depth picture, if the texture block of the texture picture corresponding to the depth block of the inter-view depth picture is encoded in the inter mode, the value of depth data of the depth block of the inter-view depth picture may be changed to a specific value indicating that depth data is invalid. Thereafter, the updated inter-view depth picture may be warped to the current depth picture. In this case, a pixel having the value indicating invalid depth data does not have depth data, such that the pixel is not warped to a current depth picture. Therefore, a pixel contained in the current depth picture corresponding to the pixel indicating the invalid depth data in the inter-view depth picture may have a specific value indicating invalid depth data. After completion of such warping, the pixel having the specific value indicating the invalid depth data in the current depth picture is detected, such that the detected pixel may be configured as a motion region. Likewise, depth data extracted from the bitstream may be allocated to the corresponding pixel configured as the motion region.

Figure 7:
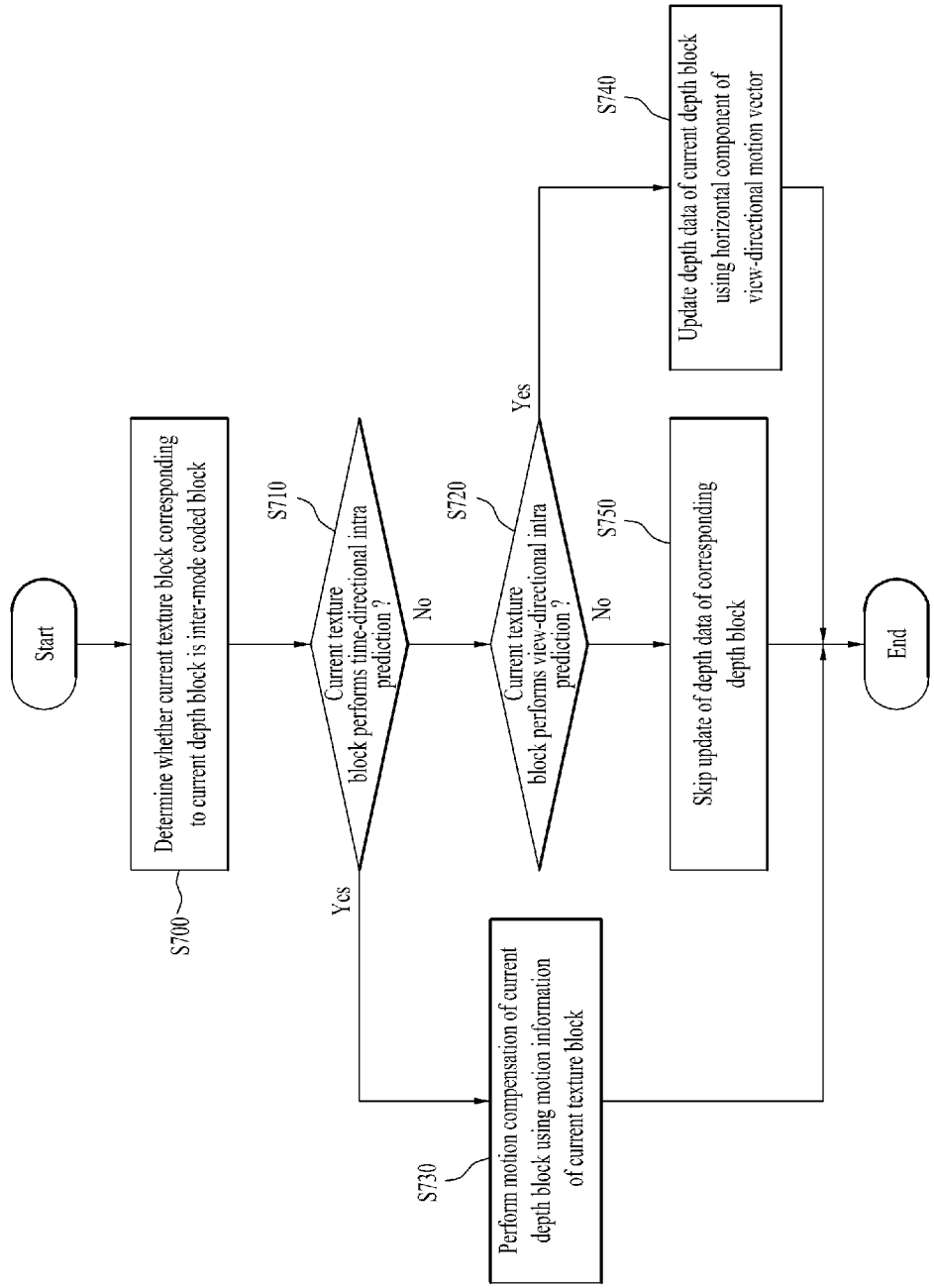
FIG. 7 is a flowchart illustrating a method for updating a depth picture used in the coding of a texture picture according to an embodiment of the present invention.

FIG. 7 is a flowchart illustrating a method for updating a depth picture used in the coding of a texture picture according to an embodiment of the present invention.

Referring to FIG. 7, it is determined whether a current texture block corresponding to the current depth block is an inter-mode coded block in step S700. Step S700 can be determined on the basis of block type information of the current texture block. In this case, block type information may indicate whether the texture block is the inter-mode coded block or the intra-mode coded block. If the current texture block is the inter-mode coded block according to the block type information, it is determined whether the current texture block performs time-directional intra prediction in step S710. The time-directional intra prediction may indicate that the texture block performs intra prediction using a reference picture located at the same viewpoint and a time-directional motion vector. If the current texture block performs time-directional intra prediction, motion compensation of the current depth block can be performed using motion information of the current texture block in step S720. That is, a reference depth block of the current depth block is specified using motion information of the current texture block, and depth data of the current depth block can be updated to depth data of the specified reference depth block. Meanwhile, if the current texture block does not perform the time-directional intra prediction, it can be determined whether the view-directional intra prediction in step S730. The time-directional inter-view prediction may indicate that the texture block performs inter-view prediction using both the reference picture located at another viewpoint and the view-directional motion vector. If the current text block performs the view-directional inter-view prediction, only a horizontal component (i.e., X component) is extracted from the view-directional motion vector of the current texture block, and depth data of the current depth lock can be updated using depth data of a reference depth block specified by the horizontal component in step S740. Alternatively, a reference depth block of the current depth block located at a reference viewpoint is specified using motion information of the current texture block, and depth data of the current depth block may also be updated to depth data of the specified reference depth block. Meanwhile, according to the confirmation result, the current texture block may not perform the view-directional intra prediction. This means an exemplary case in which the current texture blocks performs intra prediction using the disparity vector derived from depth data of the current depth block. In this case, depth data is derived from the corresponding disparity vector, and depth data of the current depth block can be updated using the depth data. However, since the disparity vector of the current texture block is derived from depth data of the current depth block, the depth data derived from the disparity vector may be identical to depth data of the current depth block. Therefore, if the current texture block performs motion compensation using the disparity vector, update of depth data of the corresponding depth block may be skipped in step S750.

In accordance with one embodiment of the present invention, the current depth picture corresponding to the current texture picture may be derived from the neighbor-time-zone depth picture located at the same viewpoint as in the current depth picture. In this case, the current depth picture may be obtained by update of the neighbor-time-zone depth picture located at the same viewpoint. A detailed update method has already been disclosed with reference to FIG. 7, and as such a detailed description thereof will here be omitted for convenience of description.

A method for deriving the current depth picture using the neighbor-time-zone depth picture located at the same viewpoint will hereinafter be described in detail.

For each of a plurality of viewpoints, one reference depth picture may be defined. In this case, the reference depth picture may indicate a depth picture referred by another depth picture of the same viewpoint. Alternatively, the reference depth picture may be a depth picture that is independently coded without referring to another depth picture of the same viewpoint. For example, the reference depth picture may be reconstructed using depth data extracted from the bitstream. Alternatively, depth data may also be reconstructed using coding information for intra prediction of the texture picture corresponding to the reference depth picture.

As described above, one reference depth picture is established for each viewpoint, and the reference depth picture is updated, so that the updated result may be used as the depth picture of the next texture picture to be coded. Since there is a small difference in output sequence between contiguous texture pictures on the decoding sequence, this means that the depth pictures may be similar to each other.

Figure 8:
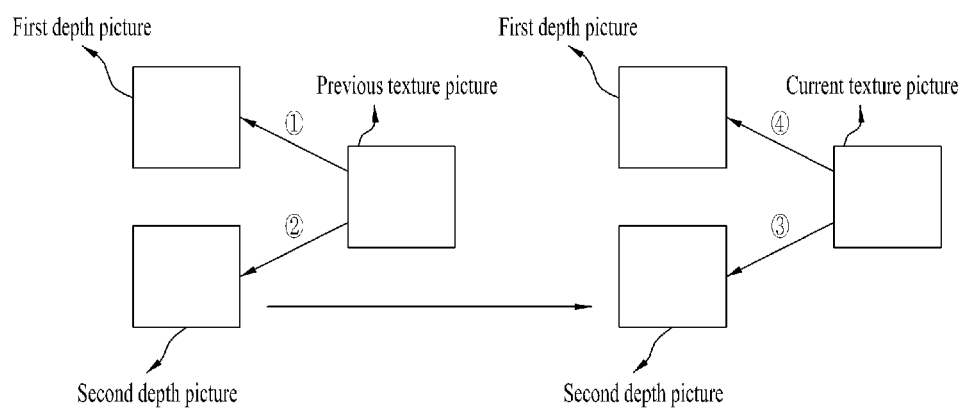
FIG. 8 is a flowchart illustrating a method for acquiring a current depth picture through mutual update between two depth pictures according to an embodiment of the present invention.

On the contrary, the scope or spirit of the present invention is not limited only to the method for defining one reference depth picture per viewpoint, and the current depth picture may be obtained using two depth pictures as shown in FIG. 8.

FIG. 8 is a flowchart illustrating a method for acquiring a current depth picture through mutual update between two depth pictures according to an embodiment of the present invention.

In this embodiment of the present invention, two depth pictures are defined for each viewpoint, and one depth picture and the other depth picture may be respectively referred to as a first depth picture and a second depth picture. A first depth picture of the previous texture picture may be obtained. In this case, the previous texture picture may be a picture that has been decoded prior to the current texture picture, according to the decoding sequence. A first depth picture of the previous texture picture may be the reference depth picture. Alternatively, the first depth picture of the previous texture picture may be obtained by update of the depth picture of the texture picture decoded prior to the previous texture picture. The previous texture picture may be decoded using the first depth picture of the obtained previous texture picture in step ①. The first depth picture may be updated using the reconstructed previous texture picture in step ②. Here, the updated first depth picture may be defined as a second depth picture. Thereafter, the second depth picture may be configured as the depth picture of the current texture picture, and the current texture picture may be decoded using the second depth picture in step ③. Likewise, the first depth picture may be updated using the reconstructed current texture picture in step ④. As described above, the depth picture of the texture picture contained in the current viewpoint may be obtained through repeated update processing of the first depth picture and the second depth picture.

The depth picture of the picture contained in the same access unit as in the current texture picture may be used as the depth picture of the current texture picture. In this case, the depth picture of the picture contained in the same access unit may be a depth picture of the picture having the lower-priority decoding order from among a plurality of pictures decoded prior to the current texture picture. In addition, the picture contained in the same access unit may not belong to the same viewpoint as that of the current texture picture. As described above, the depth picture of the picture contained in the same access unit is warped to derive the current depth picture.

The depth picture created by the above-mentioned method may be the predicted depth picture, and the reconstructed depth picture may be used to derive the correct disparity vector. For example, depth residual data of the depth picture may be extracted from the bitstream, and dequantization and inverse transform of the depth residual data may be performed so that the depth residual data can be decoded. In this case, the depth residual data may be defined as differential data between the reconstructed depth data and the predicted depth data. The decoded depth residual data is added to the predicted depth picture, so that the depth picture can be reconstructed.

Figure 2:
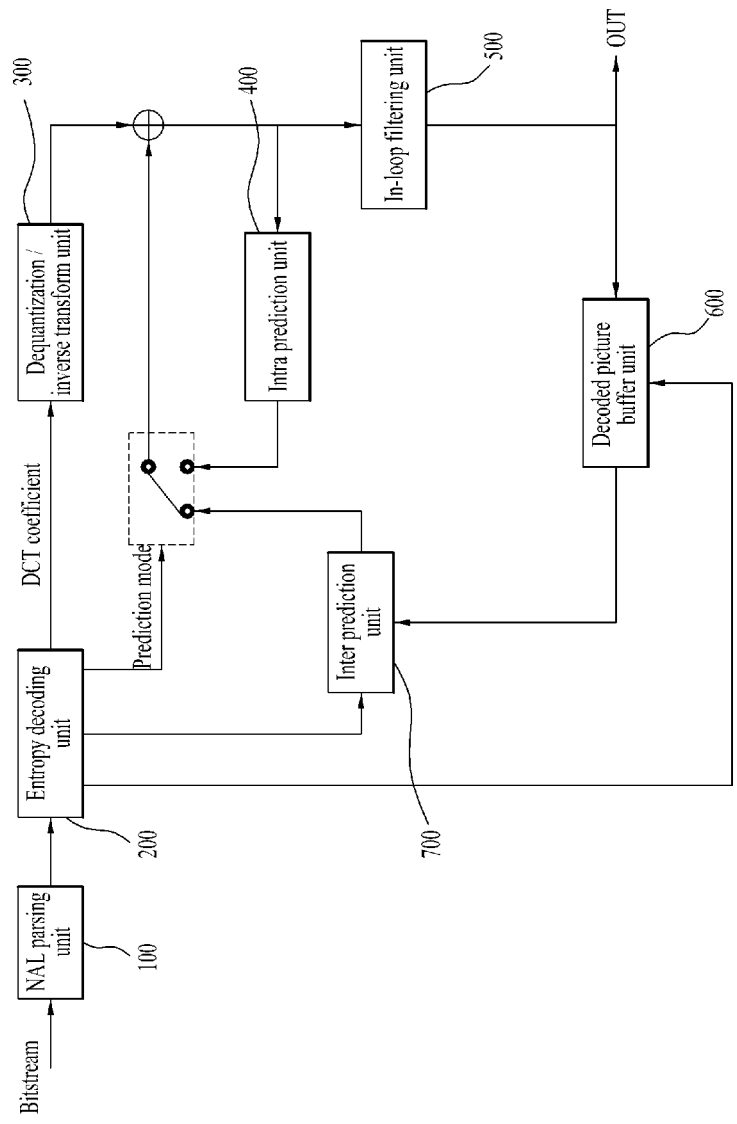
FIG. 2 is a block diagram of a video decoder according to an embodiment to which the present invention is applied.

Furthermore, the reconstructed and filtered depth picture may be applied to the present invention. The in-loop filter may be applied to the reconstructed depth picture, so that the image quality can be increased and the edge part of each block can be coordinated. Here, the region-based adaptive loop filter or the trilateral loop filter may be applied to the in-loop filtering unit 500 of FIG. 2, and a detailed description thereof will herein be omitted for convenience of description.

A method for acquiring depth data of the depth block contained in the depth picture will hereinafter be described in detail. As described above, depth data of the obtained depth picture may be used without change. Alternatively, depth data of the current depth block may be predicted using the neighbor depth block contiguous to the current depth block, and a detailed description thereof will hereinafter be described with reference to FIG. 9. FIG. 9 shows the neighbor depth blocks (A, B, D, E) contiguous to the current depth block C according to an embodiment of the present invention. Referring to FIG. 9, the neighbor depth block contiguous to the current depth block may include at least one of depth blocks contiguous to the left side, the upper side, the left upper side, and the right upper side. Depth data of the current depth block may be estimated from an average or median value of depth data of the neighbor depth block. Alternatively, depth data of the current depth block may be estimated by selectively using any one of depth data of the neighbor depth block. A method for selecting any one of the neighbor depth blocks will hereinafter be described in detail.

In accordance with one embodiment of the present invention, depth data of the current depth block can be estimated using the depth ID information. The depth indication information may be specific information that specifies the neighbor depth block used for predicting depth data of the current depth block from among the depth block candidates. In this case, the depth block candidate may include the neighbor depth blocks contiguous to the upper end, the left upper end, and the right upper end. Therefore, depth data may be extracted from the neighbor depth block specified by depth indication information, and the extracted depth data may be configured as a depth data prediction value of the current indication information.

In accordance with one embodiment of the present invention, depth indication information of the current depth block may be restrictively extracted on the basis of the depth reference information. The depth reference information may indicate specific information for indicating whether depth indication information of the current depth block is derived from depth indication information of the previous depth block coded prior to the current depth block. For example, depth reference information of the current depth block may indicate that depth indication information of the current depth block is derived from depth indication information of the previous depth block coded prior to the current depth block, and depth indication information of the previously coded depth block may specify the left neighbor depth block. In this case, depth indication information of the current depth block may specify the left neighbor depth block according to the depth reference information, and the current depth block may predict depth data of the current depth block using depth data of the depth block contiguous to the left side of the current depth block. If the depth reference information indicates that depth indication information of the current depth block is not derived from the previously coded depth block, depth indication information of the current depth block can be obtained from the bitstream.

In accordance with one embodiment of the present invention, depth data of the current depth block can be predicted using depth indication flag information. In this case, depth indication flag information may be flag information for specifying a depth block used to predict depth data of the current depth block from among the left neighbor depth block and the upper neighbor depth block. That is, depth data of the current depth block can be predicted using depth data of the left neighbor depth block or the upper neighbor depth block according to the depth indication flag information. On the contrary, depth indication flag information may be obtained from the bitstream according to the result of comparison that compares a difference in depth data between the left neighbor depth block and the upper neighbor depth block with a predetermined constant value. For example, if the difference in depth data between the neighbor depth blocks is higher than the predetermined constant value, it may be determined that the current depth block is located at a boundary between the object and the background. In this case, the current depth block may have depth data similar to any one of the left neighbor depth block and the upper neighbor depth block. Therefore, if a difference in depth data between the neighbor depth blocks is higher than the predetermined constant value, the depth indication flag information can be extracted, and depth data of the current depth block can be predicted using depth data of the neighbor depth block specified by the extracted depth indication flag information.

Until now, various embodiments for acquiring depth data of the current depth picture or the current depth block have been disclosed above. However, the disparity vector used for calculation of depth data is a block-based vector value, such that there is a limitation to correctly derive the pixel-based depth data. Even when depth data is updated on the basis of motion information of the texture picture, there is a little difference between the corresponding motion information and the actual motion information, so that the updated depth data is merely an approximate value. In addition, the method for deriving the depth picture through warping may unavoidably incur distortion of some depth data due to the occurrence of a hole during the warping process. A method for improving the accuracy of depth data by correcting depth data of the depth picture prior to coding of the current texture picture according to the embodiment of the present invention will hereinafter be described in detail.

Figure 10:
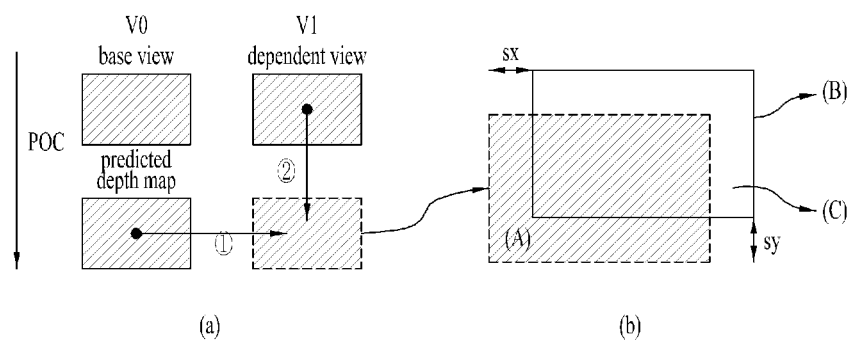
FIG. 10 is a flowchart illustrating a method for correcting a depth picture using a global shift vector according to an embodiment of the present invention.

FIG. 10 is a flowchart illustrating a method for correcting a depth picture using a global shift vector according to an embodiment of the present invention.

Referring to FIG. 10, a global shift vector according to the present invention may indicate vector information for compensating for spatial and/or temporal disparity of the current depth picture. Referring to FIG. 10(a), the current depth picture may be derived from the neighbor depth pictures that are spatially contiguous to each other ① and/or temporally contiguous to each other ②. If the current depth picture is derived from the spatially contiguous depth picture, there is a need to compensate for spatial disparity of the current depth picture. If the current depth picture is derived from the temporally contiguous depth picture, there is a need to compensate for temporal motion variance of the current depth picture. Therefore, in order to reflect the overall average disparity of the current depth picture for which the spatial and/or temporal disparity compensation is needed, the global shift vector may be used. The global shift vector may be coded in units of a picture or GOP (Group Of Pictures). Alternatively, the global shift vector may be estimated using the average of the motion vectors obtained at a base view. The accuracy of depth data of the current depth picture can be improved using the global shift vector.

Referring to FIG. 10(b), the picture (A) may denote the current depth picture, and the picture (B) may denote the shifted current depth picture. The current depth picture may be shifted to the x direction by a predetermined distance (sx), may be shifted to the y direction by a predetermined distance (sy), so that the shifted current depth picture can be generated. In this case, (sx, sy) may denote the global shift vector. The picture (B) created by the global shift vector may include the region (C) not contained in the picture (A). Depth data of the region (C) may be derived using depth data of the picture (A). For example, depth data of the region (C) may be derived using depth data contained in the picture (A) located at the edge between the region (C) and the picture (A). Alternatively, depth data of the region (C) may be derived using hole depth data. In this case, hole depth data may be depth data allocated to the region (C), and may be coded by the encoder and transmitted to the decoder. If the region (C) is obtained by extending of the legacy object, depth data of the region (C) may be derived using depth data located at the edge of the picture (A). However, if a new object appears in the region (C), the new object may be derived using hole depth data transmitted from the encoder. For this purpose, padding indication information may be defined, and a detailed description thereof will hereinafter be described with reference to FIG. 11.

Figure 11:
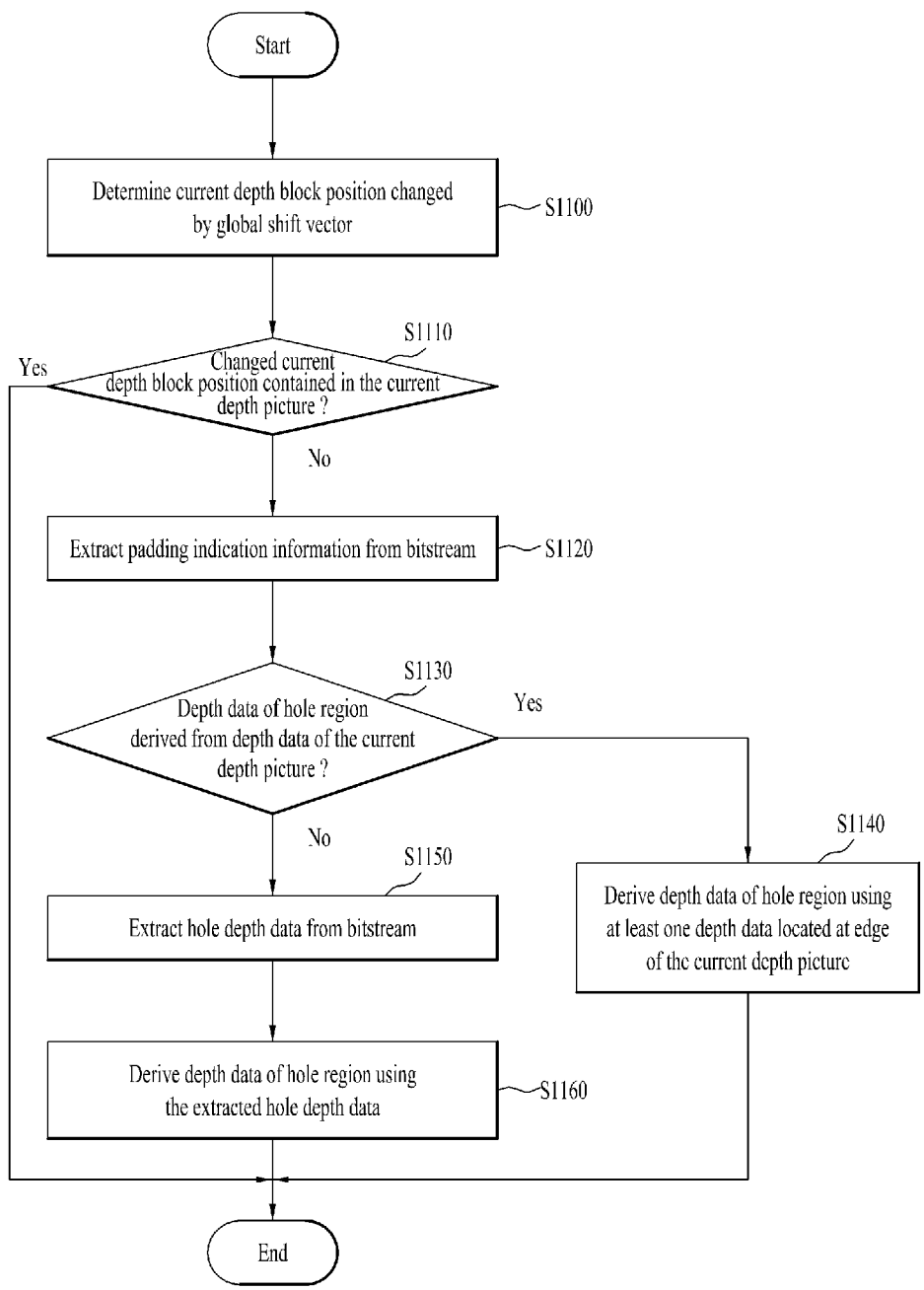
FIG. 11 is a flowchart illustrating a method for correcting a current depth picture using a global shift vector and padding indication information according to an embodiment of the present invention.

FIG. 11 is a flowchart illustrating a method for correcting a current depth picture using a global shift vector and padding indication information according to an embodiment of the present invention.

Referring to FIG. 11, the position of a current depth block changed by the global shift vector may be decided in step S1100. It can be determined whether the position of the changed current depth block is contained in the current depth picture in step S1110. Specific information indicating whether the current depth picture position is contained in the current depth picture may be determined on the basis of dimension information of the current depth picture related to the current depth block position. That is, the above-mentioned decision may be determined on the basis of specific information indicating whether the x coordinates of the changed current depth block belong to the width range of the current depth picture, or may be determined on the basis of specific information indicating whether the y coordinates of the current depth block belong to the height range of the current depth picture. If the position of the changed depth block is not contained in the current depth picture, padding indication information may be extracted from the bitstream in step S1120. The padding individual information may indicate specific information indicating whether depth data of the hole region will be derived from depth data of the current depth picture. In this case, the hole region may indicate a region contained in the current depth picture changed by the global shift vector, and may also indicate a region not contained in the current depth picture before the global shift vector is changed. The padding indication information may indicate whether depth data of the hole region is derived from depth data of the current depth picture in step S1130. If the extracted padding indication information indicates that depth data of the hole region is derived from depth data of the current depth picture, depth data of the hole region may be derived using at least one depth data located at the edge of the current depth picture in step S1140. In this case, depth data located at the edge of the current depth picture may be specified in consideration of the position of the hole region. For example, if the hole region is located at the upper end of the current depth picture, at least one depth data located at the edge of the upper end of the current depth picture may be used. Alternatively, if the hole region is located at the right upper corner of the current depth picture, depth data located at the right upper corner contained in the current depth picture may be used. Alternatively, the depth data located at the edge of the current depth picture may be derived from the average of depth data of the upper end, the right upper end, and the right edge. On the contrary, if the extracted padding indication information indicates that depth data of the hole region is not derived from depth data of the current depth picture, hole depth data may be extracted from the bitstream in step S1150. Although the hole depth data may indicate specific data that is coded by the encoder and then transmitted as described above, the scope or spirit of the present invention is not limited thereto, and predetermined depth data may be applied to the decoder. Depth data of the hole region may be derived using the extracted hole depth data in step S1160. If the changed current depth block position is contained in the current depth picture, depth data corresponding to the changed current block position may be the corrected depth data, so that the padding indication information need not be extracted.

In accordance with one embodiment, depth data of the current depth block may be corrected using the global disparity weight and the global disparity offset. The global disparity weight may be a scaling factor applied to depth data of the current depth block. In addition, the global disparity offset may be defined as a differential value between the scaled depth data and the corrected depth data. For example, the depth data corrected on the basis of the global disparity weight and the global disparity offset may be represented by a linear function as shown in Equation 8.

$$d'_i = (GDW) \times d_i + (GDO) \quad \text{[Equation 8]}$$

In Equation 8, $d'_i$ may denote the corrected depth data, GDW may denote the global disparity weight, $d_i$ may denote currently corrected depth data, and GDO may denote the global disparity offset. Meanwhile, the global disparity weight and the global disparity offset may be extracted from the bitstream, or may be derived from the predetermined value of the decoder. In addition, the global disparity weight and the global disparity offset may be obtained on a picture basis, or may also be obtained on a block basis so as to obtain the correct depth data.

A method for deriving the motion vector of the target block using the disparity vector of the target block will hereinafter be described in detail.

In the present invention, motion vector may be flexibly understood to be a spatial motion vector, a temporal motion vector, and a disparity vector. The obtained disparity vector may be configured as a motion vector of the target block. Alternatively, the disparity vector may be used as a predicted motion vector of the target block. In this case, the motion vector differential value may be coded and transmitted through the bitstream. The motion vector differential value may indicate a differential vector between the reconstructed motion vector and the predicted motion vector. The decoder may extract the motion vector differential value from the bitstream through entropy docoding. Furthermore, the motion vector of the target block can be reconstructed using the disparity vector and the extracted motion vector differential value.

The motion vector of the target block can be derived using the list of motion vector candidates including the disparity vector. A method for generating a motion vector candidate list and a method for driving the motion vector of the target block from the motion vector candidate list according to the present invention will hereinafter be described with reference to FIGS. 12 and 13.

Figure 12:
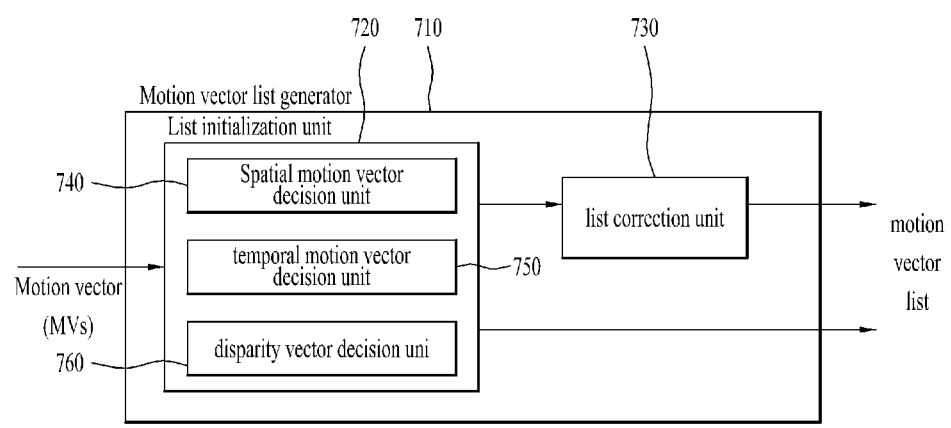
FIG. 12 is a conceptual diagram illustrating a motion vector list generator 710 according to an embodiment of the present invention.

FIG. 12 is a conceptual diagram illustrating a motion vector list generator 710 according to an embodiment of the present invention.

Referring to FIG. 12, the motion vector list generator 710 may be contained in the inter prediction unit 700 of the decoder. The motion vector list generator 710 may largely include the list initialization unit 720 and the list correction unit 730. The list initialization unit 720 may generate the motion vector list composed of the motion vector candidates. Here, the motion vector candidate may indicate the set of motion vectors, each of which is used as a predicted motion vector of the target block. The motion vector candidate of the present invention may include at least one of the spatial motion vector, the temporal motion vector, and the disparity vector. In addition, the motion vector used by the reference block of the neighbor viewpoint may be designated by the disparity vector, and may be used as a motion vector candidate. The spatial motion vector decision unit 740 contained in the motion vector list initialization unit 720 may decide the spatial motion vector on the basis of the motion vector of the neighbor block spatially contiguous to the target block. A method for determining the spatial motion vector will hereinafter be described with reference to FIG. 7. The temporal motion vector decision unit 750 contained in the list initialization unit 720 may decide a motion vector of the neighbor block temporally contiguous to the target block to be a temporal motion vector. For example, the temporally contiguous neighbor block may correspond to a collocated block that is located at the same position as in the target block within the reference picture belonging to the same viewpoint of the target block. In this case, the reference picture may be specified by reference index information of the picture including the collocated block. In addition, the disparity vector decision unit 760 contained in the list initialization unit 720 may decide the disparity vector added to the motion vector list. A method for adding the disparity vector to the motion vector list according to the present invention will hereinafter be described with reference to FIG. 8.

The motion vector list generated by the list initialization unit 720 may be used as the last motion vector list for deriving a motion vector of a target block, and may be modified through the list correction unit 730 so as to remove redundancy between the motion vector candidates. For example, the list correction unit 730 may confirm whether the spatial motion vectors of the motion vector list generated by the list initialization unit 720 are identical to each other. According to the confirmation result, if the same spatial motion vectors are present, any one of two spatial motion vectors may be removed from the motion vector list. Furthermore, after redundancy between the motion vector candidates is removed from the motion vector list, if the number of motion vector candidates remaining in the motion vector list is less than 2, a zero motion vector may be added. In contrast, after redundancy between the motion vector candidates is removed, if the number of motion vector candidates remaining in the motion vector list is higher than 2, the remaining motion vector candidates other than two motion vector candidates may be removed from the motion vector list. In this case, the two motion vector candidates remaining in the motion vector list may have relatively low list ID indexes within the motion vector list. The list ID index may be allocated to each motion vector candidate contained in the motion vector list, and may indicate the number for identifying the motion vector candidate contained in the motion vector list.

Figure 13:
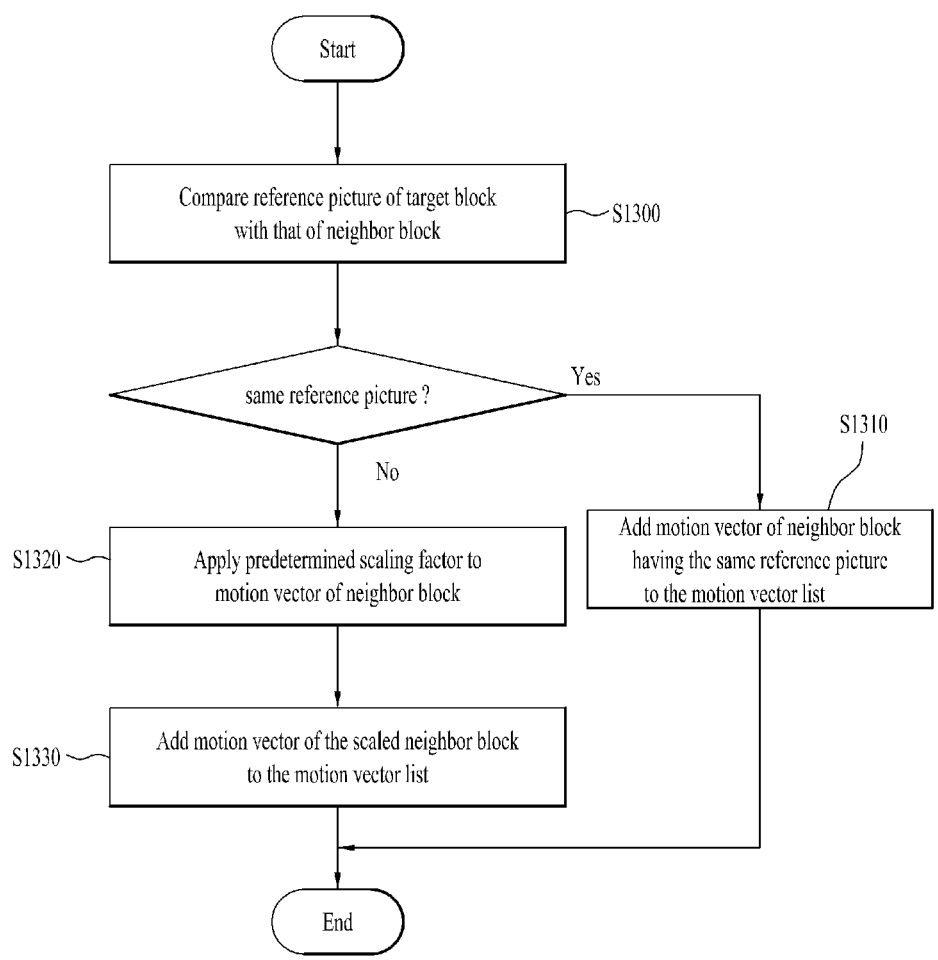
FIG. 13 is a flowchart illustrating a method for determining a spatial motion vector according to an embodiment of the present invention.

FIG. 13 is a flowchart illustrating a method for determining a spatial motion vector according to an embodiment of the present invention.

Referring to FIG. 13, the spatial motion vector may be decided on the basis of the motion vector of the neighbor block spatially contiguous to the target block. The spatially contiguous neighbor block may be any one of blocks respectively located at the left side, the upper end, the left lower side, the left upper side, and the right upper side. When the spatial motion vector is decided, it can be determined whether the reference pictures of the target block and the neighbor block are identical to each other in step S1300. For example, in order to determine whether the reference picture of the target block is identical to the reference picture of the neighbor block, it can be determined whether reference index information is identical. Alternatively, it can be determined whether POC (Picture Order Count) information allocated to the reference picture of the target block is identical to POC information allocated to the reference picture of the neighbor block. Even when the reference picture list used by the target block is different from that of the neighbor block, POC information allocated to the reference pictures is compared, so that it can be determined whether the reference pictures are identical to each other. POC information may indicate the output sequence of the pictures or the temporal sequence, and the output sequence is a unique value of each picture. In addition, the process for determining whether the reference pictures are identical to each other may be performed by dividing a neighbor neighbor block into two groups. For example, the left neighbor block and the left-lower neighbor block of the target block may be grouped into a first group, the upper neighbor block, the left upper neighbor block, and the right upper neighbor block of the target block may be grouped into a second group. In this case, it may be determined whether the reference picture of the target block is identical to that of at least one neighbor block contained in the first group, and it may also be determined whether the reference picture of the target block is identical to that of at least one neighbor block contained in the second group. In addition, the process for determining the presence or absence of reference picture identity may be performed by comparing the target block with the neighbor block according to the predetermined order. For example, in case of the first group, the presence or absence of reference picture identity may be compared in the order of the left-lower neighbor block and the left neighbor block. In case of the second group, the presence or absence of reference picture identity may be compared in the order of the right-upper neighbor block, the upper neighbor block, and the left-upper neighbor block. If the presence of reference picture identity between the target block and the neighbor block is decided in step S1300, the motion vector of the neighbor block having the same reference picture may be added to the motion vector list in step S1310. On the contrary, if the absence of reference picture identity between the target block and the neighbor block is decided, a predetermined scaling factor may be applied to the motion vector of the neighbor block in step S1320. The scaling factor may be decided in consideration of a temporal distance between the current picture having a target block and the reference picture of the target block. For example, the scaling factor may be determined in consideration of a differential value between one POC allocated to the current picture and the other POC allocated to the reference picture of the target block. In addition, the temporal distance between the current picture and the reference picture of the neighbor block may further be considered. For example, the temporal distance may also be determined in consideration of a differential value between one POC allocated to the current picture and the other POC allocated to the reference picture of the neighbor block. The motion vector of the scaled neighbor block may be added to the motion vector list in step S1330.

The method for generating the motion vector list has already been disclosed with reference to FIGS. 12 and 13, and a method for deriving a motion vector of the target block from the motion vector list by the inter prediction unit 700 will hereinafter be described in detail.

Motion vector ID information of the target block may be extracted from the bitstream. The motion vector ID information may be used to specify the motion vector candidate contained in the motion vector list used as the predicted motion vector of the target block. That is, the motion vector candidate corresponding to the extracted motion vector ID information may be extracted from the motion vector list, and the extracted motion vector may be configured as the predicted motion vector of the target block. In addition, the coded motion vector differential value for the target block may be transmitted through the bitstream. The motion vector differential value may indicate a differential vector between the decoded motion vector and the predicted motion vector. The motion vector of the target block may be decoded using the motion vector obtained from the motion vector list and the motion vector differential value extracted from the bitstream. The pixel value of the target block may be predicted using the decoded motion vector and the reference picture list. In this case, the reference picture list may include one reference picture for temporal prediction and the other reference picture for inter-view prediction.

As described above, the decoding/encoding apparatus to which the present invention is applied may be included in a multimedia broadcast transmitting/receiving system such as a DMB (Digital Multimedia Broadcasting) system and used to decode a video signal, a data signal and the like. In addition, the multimedia broadcast transmitting/receiving system may include a mobile communication terminal.

The decoding/encoding method to which the present invention is applied can be implemented as a program to be executed in a computer and stored in a computer readable recording medium and multimedia data having a data structure according to the present invention can be stored in the computer readable recording medium. The computer readable recording medium includes all types of storage devices storing data readable by a computer system. Examples of the computer readable recording medium include ROM, RAM, CD-ROM, magnetic tapes, floppy disks, optical data storage devices, etc. and also include implementation in the form of carrier wave (e.g. transmission over the Internet). Furthermore, a bitstream generated by the encoding method can be stored in the computer readable recording medium or transmitted through a wired/wireless communication network.

INDUSTRIAL APPLICABILITY

The present invention can be used to code a video signal.

The invention claimed is:

1. A method for processing a video signal, the method comprising:
   acquiring a disparity vector of a target block, wherein the disparity vector indicates a difference between a position of the target block in a current view and a position of a reference block in a neighbor view;
   identifying whether a reference picture of the target block is identical with a reference picture of a neighbor block;
   determining a motion vector list for the target block based on identifying, wherein the motion vector list comprises one or more motion vector candidates for a predicted motion vector of the target block, and the one or more motion vector candidates include at least one of a spatial motion vector, a temporal motion vector, and the disparity vector;
   extracting motion vector identification (ID) information for the target block from a bitstream, wherein the motion vector ID information is used to specify a motion vector candidate used as a predicted motion vector of the target block in the motion vector list;
   determining a predicted motion vector of the target block as the motion vector candidate corresponding to the motion vector ID information; and
   performing motion compensation based on the predicted motion vector, wherein the acquiring the disparity vector includes;
   acquiring a current depth picture corresponding to a current texture picture having the target block;
   acquiring position information of a corresponding block contained in the current depth picture from position information of the target block;
   acquiring depth data corresponding to position information of the corresponding block; and deriving the disparity vector of the target block using the acquired depth data and a camera parameter.

2. The method according to claim 1, wherein the acquiring the current depth picture includes:
   comparing view identification (ID) information of the current texture picture with view ID information of a reference picture contained in a reference picture list;
   when the view ID information of the current texture picture is identical to the view ID information of the reference picture according to the comparison, acquiring a difference value in output sequence information between the current texture picture and the reference picture; and
   selecting a reference picture having a minimum difference value as the current depth picture of the current texture picture.

3. The method according to claim 2, wherein:
   when the number of reference pictures having the minimum difference value is plural, a reference picture having minimum output sequence information from among the reference pictures having the minimum difference value is selected as the current depth picture.

4. The method according to claim 1, further comprising:
   determining whether to apply a region-based adaptive loop filter to a current pixel value based on a variance of a depth block contained in the current depth picture, wherein the variance of the depth block indicates a difference between a maximum pixel value and a minimum pixel value within the depth block; and
   when the region-based adaptive loop filter is applied, acquiring a filtered current pixel value by applying a weight to a neighbor pixel value, wherein the neighbor pixel value is one of pixel values contained in a depth block other than the current pixel value, wherein the depth data is acquired from a depth picture to which the region-based adaptive loop filter is applied.

5. The method according to claim 1, wherein the determining the motion vector list of the target block includes:
   when the reference picture of the target block is identical with the reference picture of the neighbor block, adding a motion vector of a neighbor block having the same reference picture to the motion vector list.

6. The method according to claim 1, wherein:
   the temporal motion vector is a motion vector for a collocated block of the target block within a reference picture in the same view as the current view of the target block, and the reference picture in the same view is specified by reference index information of a picture having the collocated block.

* * * * *